United States Patent [19]

Prewo et al.

[11] Patent Number: 4,626,461
[45] Date of Patent: * Dec. 2, 1986

[54] GAS TURBINE ENGINE AND COMPOSITE PARTS

[75] Inventors: Karl M. Prewo, Vernon; John J. Brennan, Portland, both of Conn.

[73] Assignee: United Technologies Corporation, Hartford, Conn.

[*] Notice: The portion of the term of this patent subsequent to Apr. 13, 1999 has been disclaimed.

[21] Appl. No.: 459,029

[22] Filed: Jan. 18, 1983

[51] Int. Cl.[4] .......................... B32B 5/02; B32B 5/08; B32B 15/08
[52] U.S. Cl. .................................. 428/113; 428/446; 428/698; 428/701; 428/428; 428/114
[58] Field of Search .................. 428/446, 35, 36, 698, 428/701, 428

[56] References Cited

U.S. PATENT DOCUMENTS

| 3,949,147 | 4/1976 | Hawthorne | 428/446 |
| 3,991,254 | 11/1976 | Takeuchi | 428/446 X |
| 4,109,050 | 8/1978 | Mehan et al. | 428/446 X |
| 4,156,051 | 5/1979 | Nakamura et al. | 428/446 X |
| 4,288,495 | 9/1981 | Terner et al. | 428/446 |
| 4,341,826 | 7/1982 | Prewo et al. | 428/446 X |

Primary Examiner—George F. Lesmes
Assistant Examiner—Nancy A. B. Swisher
Attorney, Agent, or Firm—Harry J. Gwinnell

[57] ABSTRACT

High strength, fracture tough, high temperature oxidatively stable, gas turbine engine core engine components are described made of silicon carbide fiber reinforced ceramic matrix or silicon carbide fiber reinforced glass matrix material. A gas turbine engine containing core engine components as above described is also disclosed.

9 Claims, 15 Drawing Figures

FIG. 1  Unidirectional
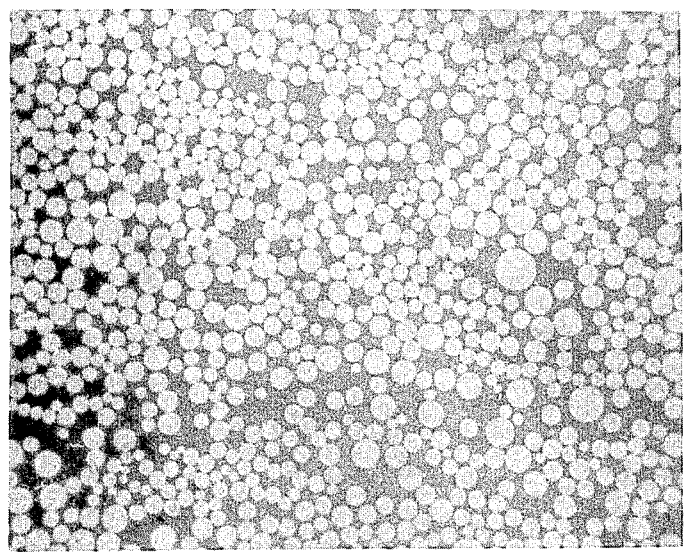
50μ
FIG. 2  0°/90° Cross-plied
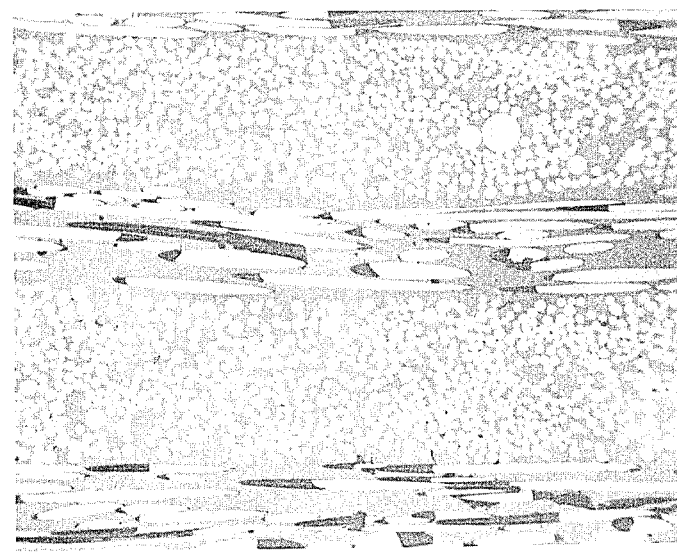
100μ

FIG. 8
FIG. 9

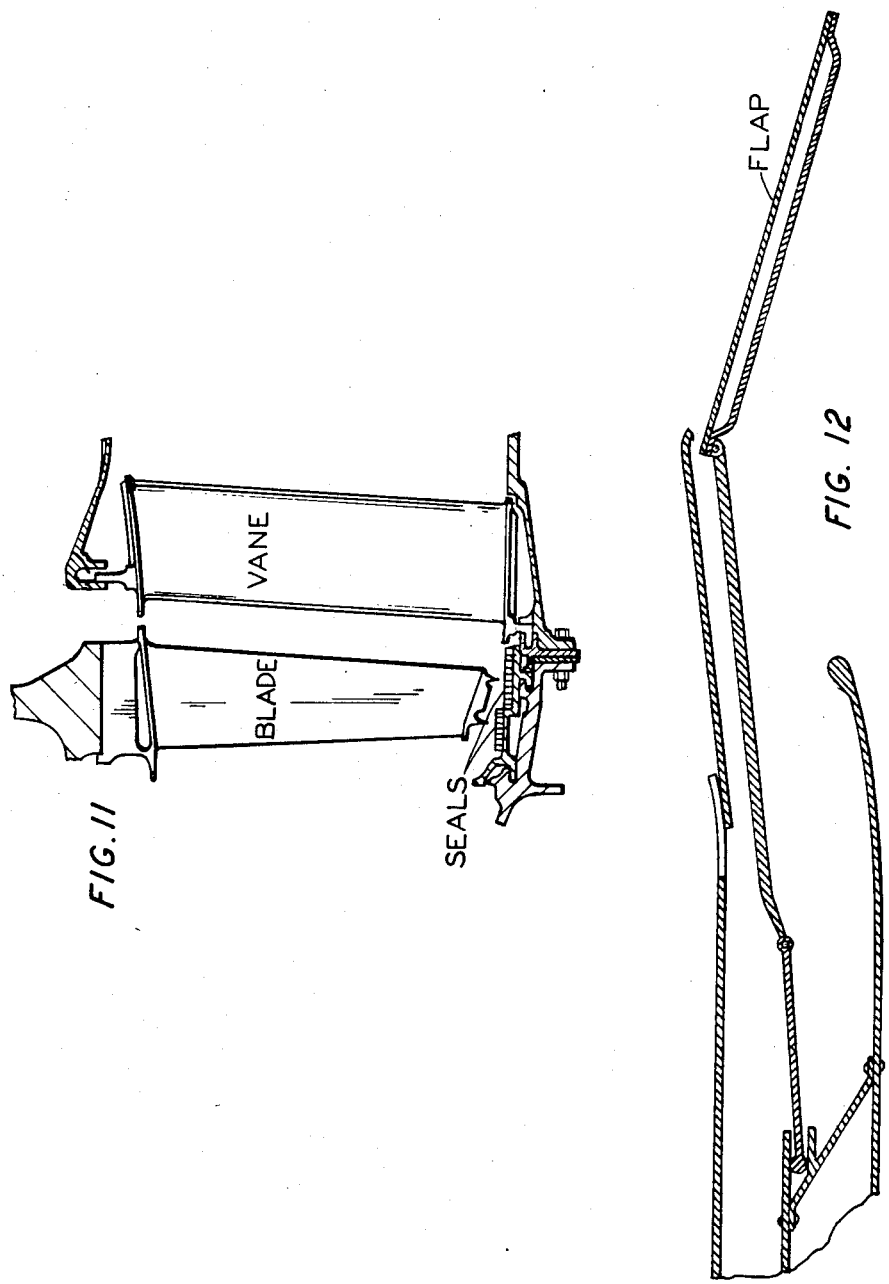

GAS TURBINE ENGINE AND COMPOSITE PARTS

DESCRIPTION

1. Technical Field

The field of art to which this invention pertains is gas turbine engines, and specifically core engine components.

2. Background Art

The cost, reliability and performance of gas turbine engines is strongly influenced by the high temperature materials used in their construction. Current aircraft, missile, ground based vehicle and ship propulsion gas turbines, as well as stationary power generation turbines all use metal superalloys to provide needed high temperature performance. Used in polycrystalline or single crystal forms, these metals also impose several important penalties on the overall gas turbine. These alloys are high density metals and thus they contribute to overall engine weight and penalize the engine thrust to weight ratio. The densities of the most significant elements used in these alloys are as follows: nickel 8.90 gm/cm$^3$; chromium 7.19 gm/cm$^3$; columbium 7.19 gm/cm$^3$; cobalt 8.9 gm/cm$^3$; and iron 7.87 gm/cm$^3$.

This high density in rotating parts is also a major cause of high stresses generated during engine operation. These stresses limit rotor speeds and particularly limit the fatigue life of high temperature discs.

These elements are very costly and, in many cases, are available only from limited sources of supply. As such Co, Cb and less abundantly used elements are referred to as "strategic elements" whose availability in times of peak demand or disrupted supply may be in question.

At very high temperatures these metal superalloys are severely limited due to their propensity to creep under applied stress. Current attempts to increase engine efficiency have caused the operating temperatures to be increased beyond those sustainable by these metals alone. Hence they require cooling by low temperature air which is forced through passages in the blades. This is done at penalty to overall engine efficiency.

Attempts have been made to overcome these deficiencies through the use of ceramic materials such as silicon carbide and silicon nitride. These ceramics are desirable in that they are capable of operating at temperatures well above those of metal superalloys and they are also much lower in density (e.g. 3.2 gm/cm$^3$). These attempts, however, have been hampered in that these ceramic materials are not fracture tough. They fail readily in the presence of stress concentrations and service induced impact damage.

Another attempt to develop high temperature gas turbine materials has centered on carbon fiber reinforced carbon matrix composites. These materials provide two major advantages over the above metals and ceramics. First, they are very low in density (2 gm/cm$^3$) and secondly they maintain strength and toughness to extremely high temperatures. Unfortunately carbon is easily decomposed by oxidation at elevated temperatures in a gas turbine and the utility of these materials is thus hinged on the development of coatings and oxidation inhibitors. Because of the extreme thermal fluctuations in a gas turbine the development of these necessary oxidation preventors has been severely limited. In addition, their reliability under stressful operating conditions or during in-service impact damage is extremely questionable. Their fabrication cost is also quite high due to the lengthy high temperature processes required to form their matrix from organic precursors.

DISCLOSURE OF INVENTION

The present invention is directed to a solution to the use of non-metallic composites in a gas turbine engine, which composites can withstand the high temperatures produced in such engine and still maintain their high strength and oxidative stability. The solution to this problem is the use of fracture tough silicon carbide fiber reinforced ceramic or silicon carbide fiber reinforced glass with high temperature strength, high temperature oxidation stability, and good heat insulating properties as gas turbine engine components.

One aspect of the invention includes the use of components comprising a multilayered-fiber reinforced ceramic made up of a plurality of ceramic layers, each layer reinforced with a plurality of unidirectional, continuous length silicon carbide fibers, each layer having an axial flexural strength greater than 70,000 psi and a high fracture toughness, exemplified by a critical stress intensity factor greater than $10 \times 10^3$ psi (inch)$^{\frac{1}{2}}$.

Another aspect of the invention includes the use of components comprising silicon carbide fiber reinforced borosilicate glass with flexural strengths above about 60,000 psi maintainable at temperatures up to about 600° C.

Another aspect of the invention includes the use of components comprising silicon carbide fiber reinforced high silica content glass with flexural strengths above about 60,000 psi maintainable at temperatures up to about 1150° C.

Another aspect of the invention includes the use of components comprising silicon carbide fiber reinforced aluminosilicate glass with flexural strengths above about 75,000 psi maintainable at temperatures up to about 700° C.

Another aspect of the invention includes the use of components comprising discontinuous silicon carbide fibers laid up in substantially in-plane random orientation in a glass matrix having strength and fracture toughness properties greater than that of the glass matrix even at elevated temperatures, e.g. in excess of 300° C. and even in excess of 500° C.

Another aspect of the invention includes the use of components comprising discontinuous silicon carbide fibers laid up in substantially in-plane random orientation in a ceramic matrix, having strength and fracture toughness properties greater than that of the ceramic matrix even at elevated temperatures, e.g. in excess of 800° C., and even in excess of 1000° C.

Another aspect of the invention includes a gas turbine engine containing core engine components made of the above recited composite materials.

The foregoing, and other features and advantages of the present invention, will become more apparent in light of the following description and accompanying drawings.

BRIEF DESCRIPTION OF THE DRAWINGS

FIG. 1 shows in cross-section an actual uniaxial silicon carbide fiber reinforced glass-ceramic matrix composite component according to the present invention.

FIG. 2 shows in cross-section an actual multiaxial silicon carbide fiber reinforced glass-ceramic matrix composite component according to the present invention.

FIG. 8 shows a top view in cross-section of an actual discontinuous silicon carbide fiber reinforced glass-ceramic matrix composite component according to the present invention.

FIG. 9 shows a fracture surface of an actual discontinuous silicon carbide fiber reinforced glass-ceramic matrix composite component according to the present invention.

FIG. 11 shows blades, vanes and seals according to the present invention.

FIG. 12 shows augmentor flaps and seals according to the present invention.

BEST MODE FOR CARRYING OUT THE INVENTION

Figure 3A:
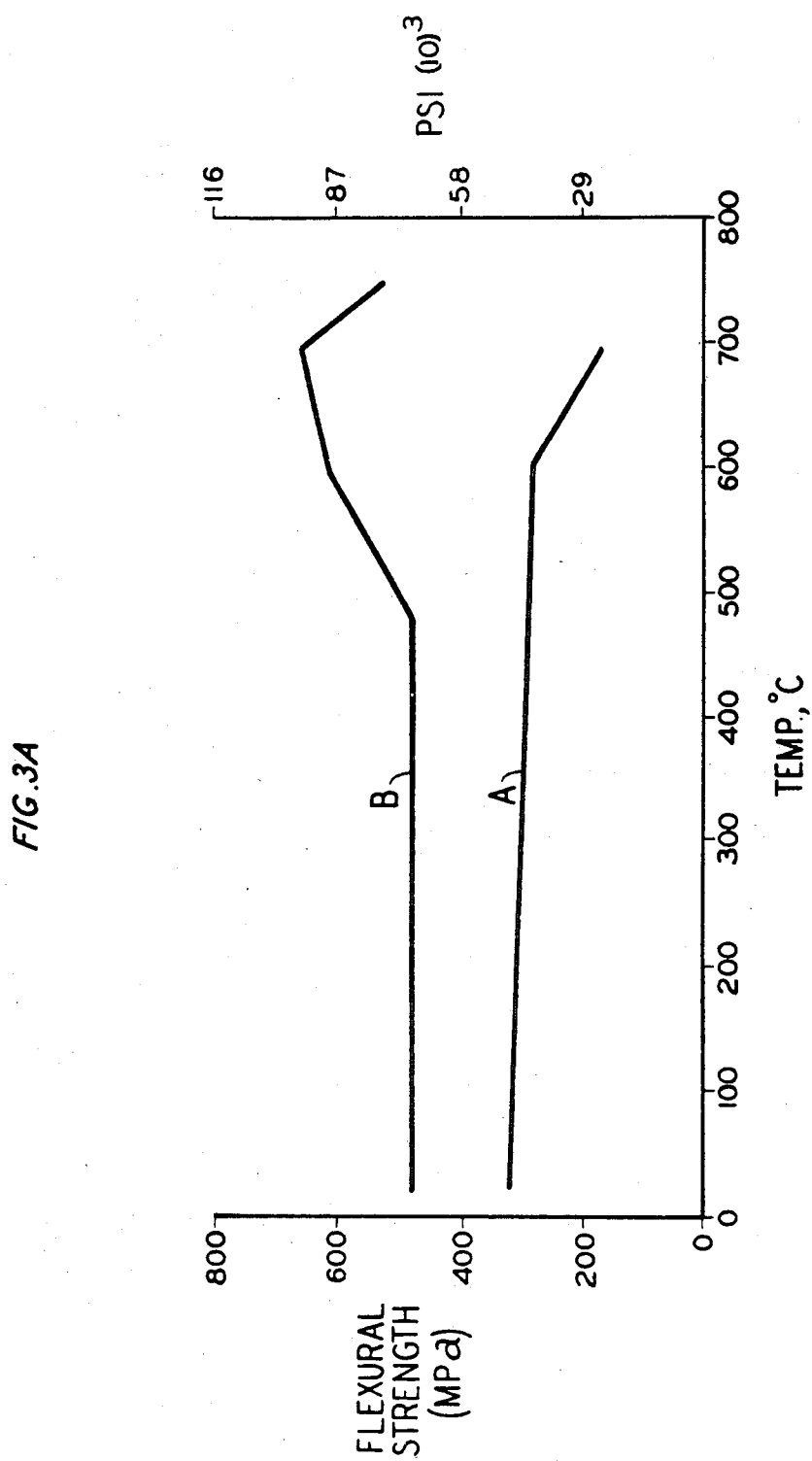
FIG. 3A shows flexural strength data for a borosilicate glass composite component reinforced with silicon carbide yarn according to the present invention.

A glass, which can be converted to a ceramic, is the preferred matrix material to form the composite components of the present invention. During composite densification the matrix is retained in the glassy state, thus avoiding fiber damage and promoting densification under low applied pressure. After densification to the desired fiber plus matrix configuration, the glassy matrix can be converted to the crystalline state, the degree and extent of crystallization being controlled by the matrix composition and heat treatment schedule employed. A wide variety of glasses can be used in this manner, however, a strict limitation on the amount and activity of titanium present in the glass is of controlling importance. Accordingly, if titania nucleating agents are used, they must be inactivated or kept below one percent by weight. This can be accomplished by simply substituting another nucleating agent such as zirconia for the conventional titania. However, in any case it is necessary to either eliminate or mask the effects of the titania on the silicon carbide fiber to attain a composite with the improved properties disclosed. This problem is believed attributable to the reactivity of the titanium to the silicon carbide fiber. And while conventional lithium aluminosilicate is the preferred glass ceramic, other conventional glass ceramics such as aluminosilicate, magnesium aluminosilicate, and combinations of the above can be used as long as the ceramic matrix material is titanium free. By titanium free is meant that the composition contains less than about 1% by weight titanium or additional components which either mask or inactivate the reactivity of the titanium toward the SiC fibers. It has also been found that the reactivity of the titanium and its adverse composite effects can be lessened by a combination of decreased titania nucleating agent concentration and lower hot pressing temperatures—e.g., a glass ceramic composition with less than 2% by weight titania, hot pressed at temperatures below about 1100° C. And, as stated above, $ZrO_2$ is a preferred substitute for the titania nucleating agent in amounts up to about 5% by weight, producing no adverse effects on the composite properties. Other nucleating agents may also be successful substitutes for the titania. It should also be noted that in general the starting glass ceramic material can be obtained in the glass state in powder form. If however, the ceramic material is obtained in crystalline form, it will be necessary to melt the material to form it into the glassy state, solidify it and subsequently crush it into powder form, preferably about −325 mesh. An important part of the invention is to select glass ceramic matrix material such as that described above which can be densified (in combination with the SiC fibers) in the glassy state with a viscosity low enough to permit complete densification with subsequent transformation into a substantially complete crystalline state providing a composite with a use temperature in excess of 1000° C. It is also possible to convert the starting crystalline powder to the glassy state during preheat treatment prior to application of pressure for densification.

If the component temperature will be kept below 1000° C., a glass matrix consisting of a high silica content glass, aluminosilicate, or borosilicate composition may be utilized. The glass matrix material should also be titanium free, such as Corning #7740 borosilicate glass, available from Corning Glass Works. Note commonly assigned U.S. Pat. Nos. 4,314,852 and 4,324,843 the disclosures of which are incorporated by reference.

The fiber reinforcement for the glass or glass-ceramic matrix is a high temperature stable, oxidation resistant material and particularly silicon carbide fibers. While any silicon carbide fiber with the requisite strength can be used with the ceramic matrix, a multifilament silicon carbide yarn with an average filament diameter up to 50 microns is preferred and yarn with average filament diameter of 5-15 microns especially preferred. Nippon Carbon Co. of Japan produces such a yarn with about 250 fibers per tow and an average fiber diameter of about 10 microns. The average strength of this fiber is approximately 2000 MPa (300,000 psi), and it has a use temperature of up to 1500° C. The yarn has a density of approximately 2.7 gm. per cc and an elastic modulus of approximately 221 GPa ($32 \times 10^6$ psi).

Several different techniques may be employed in making the desired component. The first comprises drawing a continuous length of reinforcing fiber through a slurry of glass powder mixed with a liquid binder, drying the impregnated fibers, in the form of a tape on a drum, and laying up the resulting fiber tape into a predetermined structural shape, and then hot pressing it into its final form, note U.S. Pat. Nos. 4,314,852 and 4,324,843 cited above.

Another method comprises preparing a mixture of glass powder and chopped fibers or whiskers at elevated temperatures and injecting this mixture into a mold of complex shape and then hot pressing into the final product. Note copending, commonly assigned U.S. patent application Ser. No. 381,805 filed May 25, 1982, now abandoned, the disclosure of which is incorporated by reference.

A third method comprises weaving the fibers or aligning them into a mold cavity in a particular shape or orientation, then introducing the glass matrix in molten form into the mold such that it surrounds and bonds the fibers. Note copending, commonly assigned U.S. patent application Ser. No. 381,801 filed May 25, 1982 now U.S. Pat. No. 4,428,763 isued 1/31/84 the disclosure of which is incorporated by reference.

Any one of these methods (and any other suitable method) is satisfactory and the one selected depends on the particular properties desired of the final structure.

As stated above, the glass and glass-ceramic constituents are generally obtained in powder form (preferably about −325 mesh) in the glassy state (noncrystalline form) and are combined in this powder state with the silicon carbide fibers by hot press consolidation. In the case of the ceramic, after densification the composite is held for a time and at a temperature sufficient to transform the noncrystalline ceramic into the crystalline state by controlled nucleation and growth of the appropriate crystalline phases. The ceramic or glass composite components are preferably formed by laying up layers containing continuous silicon carbide fibers and the powdered ceramic or the powdered glass. The articles formed are then hot pressed at elevated temperatures to form the composite components. The processing parameters and composition of the material can vary widely depending on component design considerations. The preferred method for forming the articles of the present invention is by hot pressing the mixture of silicon carbide fibers and noncrystalline ceramic powder or glass as mentioned above. This method gives particular design flexibility in orienting the fibers, and sheets formed by such method are particularly adapted to hot pressing into desired shapes. An exemplary method comprises continuously unwinding a tow of silicon carbide fibers (yarn) from a spool at a moderate rate of speed and passing such fibers through a slip of the powdered ceramic or powdered glass, solvent and plasticizer to impregnate the two. The impregnated fibers are then rewound onto a larger rotating spool. An exemplary slip composition may be composed of 40 gm. of powdered glass or powdered ceramic and 780 ml of propanol. An alternative composition may comprise 100 gm. of the glass, 200 ml of water, and 100 ml of a latex binder such as Rhoplex ®. Rhoplex ® is a resin suspension or dispersion marketed by Rohm and Haas, Philadelphia, Pa. Excess glass or ceramic and solvent can be removed by pressing a squeegee against the drum as it winds. Preferably the ground ceramic or glass is sized so that 90% of it passes through a −325 mesh sieve. The thus impregnated tape is then dried either at ambient temperature or with a radiant heat source to remove solvent. Where an organic binder or other higher melting organic adjuvant has been utilized, it may be necessary to fire the tape at somewhat elevated temperatures to burn out the organic materials prior to hot-pressing.

Following impregnation, the fiber is removed from the drum and cut into strips to conform to the dimensions of the article to be fabricated. The fibers are then laid up in alternating ply stacks in any sequence desired, e.g., each layer unidirectional, alternating plies of 0° and 90°, or 0°/30°/60°/90°, 0°/±45°/90°, etc. In a key processing step the assembled composite is then hot pressed either under vacuum or under inert gas such as argon in metal dies coated with colloidal boron nitride or graphite dies sprayed with boron nitride powder at pressures of 6.9–13.8 MPa (1000–2000 psi) and temperatures of 1100–1500° C. Time of hot pressing will vary depending on composite makeup but generally will be accomplished between about 1 minute and 1 hour. Additional glass or ceramic also in powder form may be inserted between each layer as it is laid. SiC fiber loading in the composite is preferably about 15% to about 70% by volume. The mold can also be vibrated to ensure uniform distribution of the ceramic powder or glass powder over the laid fiber surfaces. In the case of the ceramic, processing by starting with the matrix material in the glassy state to permit composite densification by hot pressing, followed by converting the ceramic into the crystalline state largely contributes to the superior properties of the resulting composite. If after hot pressing any significant portion of the ceramic matrix material is found to be in the glassy state, further heat treatment may be necessary to substantially completely crystallize the matrix for optimum high temperature performance. And although it is preferred to have the ceramic matrix material in the fully ceramic state, acceptable composite properties are attainable even if some of the ceramic matrix is retained in the composite in the glassy state, e.g. up to 25% by weight.

Based on the composition of the matrix material; the particular fiber reinforcement, and the process of forming the composite, an article with exceptional high strength, fracture toughness, and oxidation resistance especially at high temperatures is obtained. Each fiber reinforced layer of the ceramic composite component regardless of the number of layers or orientation has an axial flexural strength greater than 70,000 psi and in some instances greater than 100,000 psi. As for fracture toughness, each layer has a critical stress intensity factor greater than $10 \times 10^3$ (inch)$^{\frac{1}{2}}$. This is clearly superior to any known ceramic matrix composite currently available, especially with the low density and oxidation resistance at high temperatures exhibited by the composites of the present invention. An indication of this thermal resistance can be seen from the data in Table I.

TABLE I

Bend Strength (3-pt) in Ar vs. Temperature for SiC Yarn/Lithium Aluminosilicate Composites (50 Volume Percent SiC).

Bend Strength ($10^3$ psi)

| Temp. °C. | Unidirectional Composite | 0°/90° Cross-plied Composite |
|---|---|---|
| 20 | 90 | 50 |
| 600 | 100 | 60 |
| 800 | 120 | 70 |
| 1000 | 140 | 70 |
| 1100 | 90 | 70 |
| 1200 | 40 | 40 |

From Table I, it can be seen that the ceramic composite components of the present invention exhibit excellent flexural strengths in a high temperature environment well in excess of 1000° C. It is also felt that based on the type of matrix employed, these strengths can be maintained over 1300° C. It should be noted that while each individual layer will have an axial flexural strength greater than 70,000 psi the overall composite could have a flexural strength of a lesser value. A uniaxially fiber oriented composite would have an overall axial flexural strength greater than 70,000 psi, however, while each individual layer in a 0°/90° multiaxially oriented lay-up of individual fiber layers would have an axial flexural strength greater than 70,000 psi, the composite would have a flexural strength of greater than 35,000 psi because half the fibers would not be in the principal test direction. However, such composite would have better overall strength and impact resistance than, say a totally uniaxially oriented composite because of the multiaxial orientation of the fibers. Such multiaxially oriented fiber composites can be impacted with significant velocity without fracture, unlike conventional monolithic ceramic articles.

By unidirectional is meant all the SiC fibers are oriented in each individual layer in substantially the same axial direction ($\pm 5°$). By uniaxial is meant that each layer in the composite is oriented such that all the unidirectionally laid fibers in all layers are oriented in substantially the same axial direction ($\pm 5°$). Note FIG. 1 which demonstrates an actual sectional view of a composite containing a plurality of unidirectionally laid SiC fibers in a lithium aluminosilicate ceramic (LAS) matrix where the composite layers are uniaxially oriented; and FIG. 2 which demonstrates an actual sectional view of a SiC fiber—lithium aluminosilicate ceramic matrix containing a plurality of unidirectional fiber layers which are multiaxially oriented in the composite—in this case oriented in an alternating 0°/90° multiaxial orientation.

The fracture toughness of this composite system has also been measured using a notched beam test with unidirectionally reinforced samples exhibiting critical stress intensity factor ($K_{IC}$) values of $19 \times 10^3$ psi (inch)$^{\frac{1}{2}}$ at room temperature (RT); $24 \times 10^3$ psi (inch)$^{\frac{1}{2}}$ at 800° C.; $27 \times 10^3$ psi (inch)$^{\frac{1}{2}}$ at 1000° C.; and $18 \times 10^3$ psi (inch)$^{\frac{1}{2}}$ at 1100° C. These values are only slightly less than some aluminum alloys possess. Even the crossplied (0°/90°) LAS/SiC yarn composites exhibit $K_{IC}$ values of over $11 \times 10^3$ psi (inch)$^{\frac{1}{2}}$ from RT to 1100° C. Monolithic Corning 9608 lithium aluminosilicate, on the other hand, has very low fracture toughness with a $K_{IC}$ of approximately $1.3 \times 10^3$ psi (inch)$^{\frac{1}{2}}$ from RT to 1000° C.

It is particularly noteworthy that, even after initial fracture, composites of the present invention retain a substantial fraction of their original untested strength. This resistance to fracture, even in the presence of initiated damage, is distinctly different from the brittle nature of conventional ceramic materials.

If a glass matrix is employed, any borosilicate glass which will impart the described properties can be used with the present invention. Corning 7740 (Corning Glass Works) was found particularly suitable to produce the desired component properties. Similarly, Corning 7930 (about 96% by wt. silica), obtained by leaching the boron from a borosilicate glass, ard Corning 1723 are the preferred high silica content glass and aluminosilicate glass, respectively. While the borosilicate glass and the aluminosilicate glass can be used in its as received $-325$ mesh size form, the desired properties for the high silica content glass composites can only be satisfactorily fabricated with the glass after it has been ball-milled in propanol for more than 100 hours. It should also be noted that mixtures of the above glasses may also be used, with properties tailored accordingly.

As with the ceramic matrix, any silicon carbide fiber system with the requisite strength can be used, although a multi-filament silicon carbide yarn with an average filament diameter up to 50 microns is preferred and yarn with average filament diameter of 5 to 15 microns is especially preferred. As stated above, Nippon Carbon Company of Japan produces such a yarn. If a silicon carbide monofilament is used, a typical silicon carbide monofilament of approximately 140 microns diameter is available from AVCO Systems Division, Lowell, Mass. This fiber exhibits an average tensile strength of up to 3450 MPa, has a temperature capability of over 1300° C. and is stable in oxidizing environments.

While a variety of methods can also be used to produce the glass composite components of the present invention, e.g. methods conventionally used to produce glassware articles, the preferred method is, as described above, by hot pressing a mixture of the silicon carbide fibers and powdered glass. As with the ceramic matrix, this method provides particular design flexibility in orienting the fibers, and composites formed by such method are particularly well adapted to hot pressing into desired shapes.

Figure 3B:
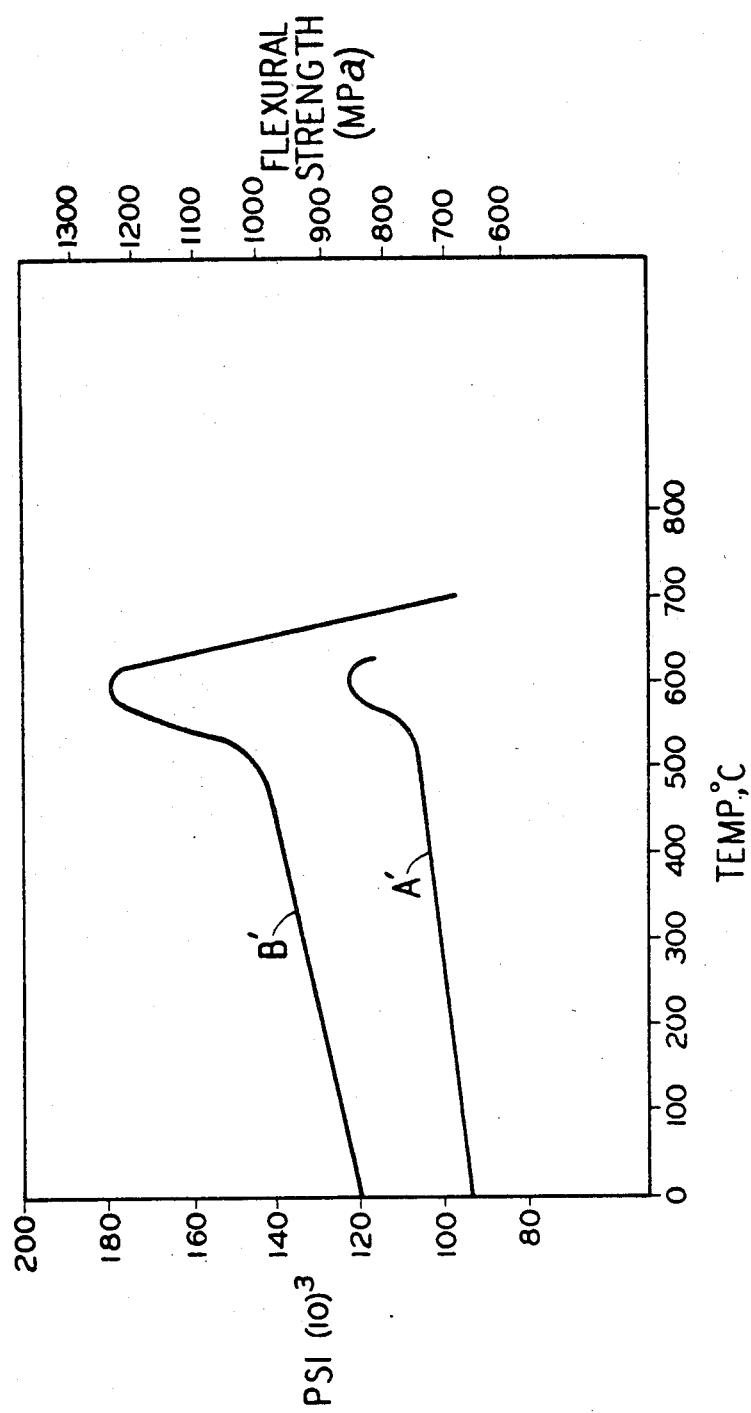
FIG. 3B shows flexural strength data for a borosilicate glass composite component reinforced with large diameter silicon carbide monofilaments according to the present invention.

In addition to exhibiting excellent fracture toughness and high flexural strength, the glass composites of the present invention maintain these properties even up to exceptionally high temperatures which makes their use particularly suitable in the gas turbine engine. FIG. 3A demonstrates the exceptional flexural strength of a borosilicate glass-silicon carbide fiber reinforced composite component utilizing silicon carbide yarn. For a 0°/90° fiber orientation (curve A), flexural strengths of over 40,000 psi up to temperatures of about 600° C. were attained. For 0° fiber orientation (curve B) flexural strengths of over 60,000 psi up to temperatures of about 600° C. were attained. And as seen in FIG. 3B, the (0° oriented) silicon carbide fiber monofilament reinforced borosilicate glass (Corning 7740) composites also exhibit high flexural strengths above 60,000 psi and as specifically demonstrated by curves A and B above 75,000 psi for curve A (35% by volume fiber loading) and above 100,000 psi for curve B (65% by volume fiber loading) which flexural strengths are maintainable at temperatures up to about 600° C. The 0°/90° silicon carbide fiber orientation in the borosilicate glass matrix produces a flexural strength above about 40,000 psi and preferably above about 50,000 psi maintainable to temperatures up to about 600° C.

Figure 4:
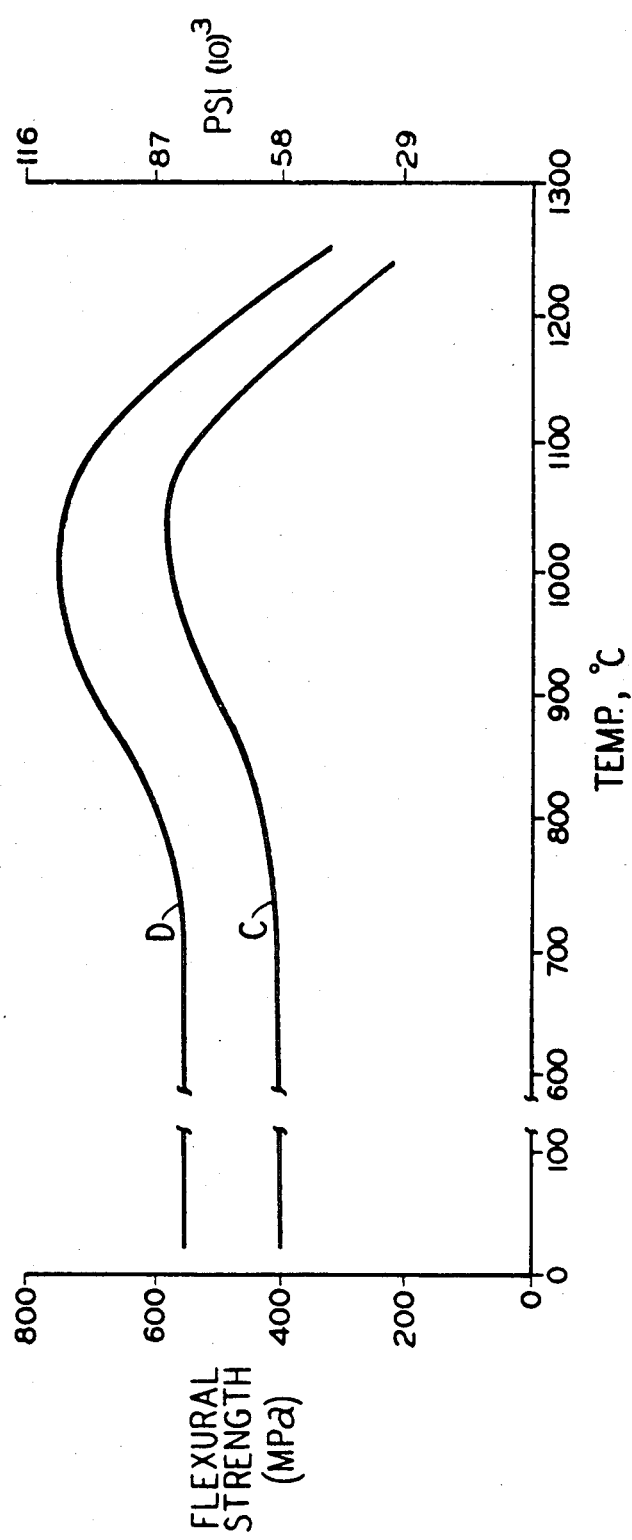
FIG. 4 shows flexural strength data for a high silica content glass composite component according to the present invention.

FIG. 4 demonstrates an exemplary high silica content glass, silicon carbide fiber (0° oriented) reinforced composite. Curves C and D represent lower and upper bounds, respectively, for sample data obtained with composites containing between 30% and 40% fiber loading, by volume. These high silica content glass composites show flexural strengths in excess of 60,000 psi, and preferably in excess of 70,000 psi, even to temperatures up to about 1150° C.

Figure 5:
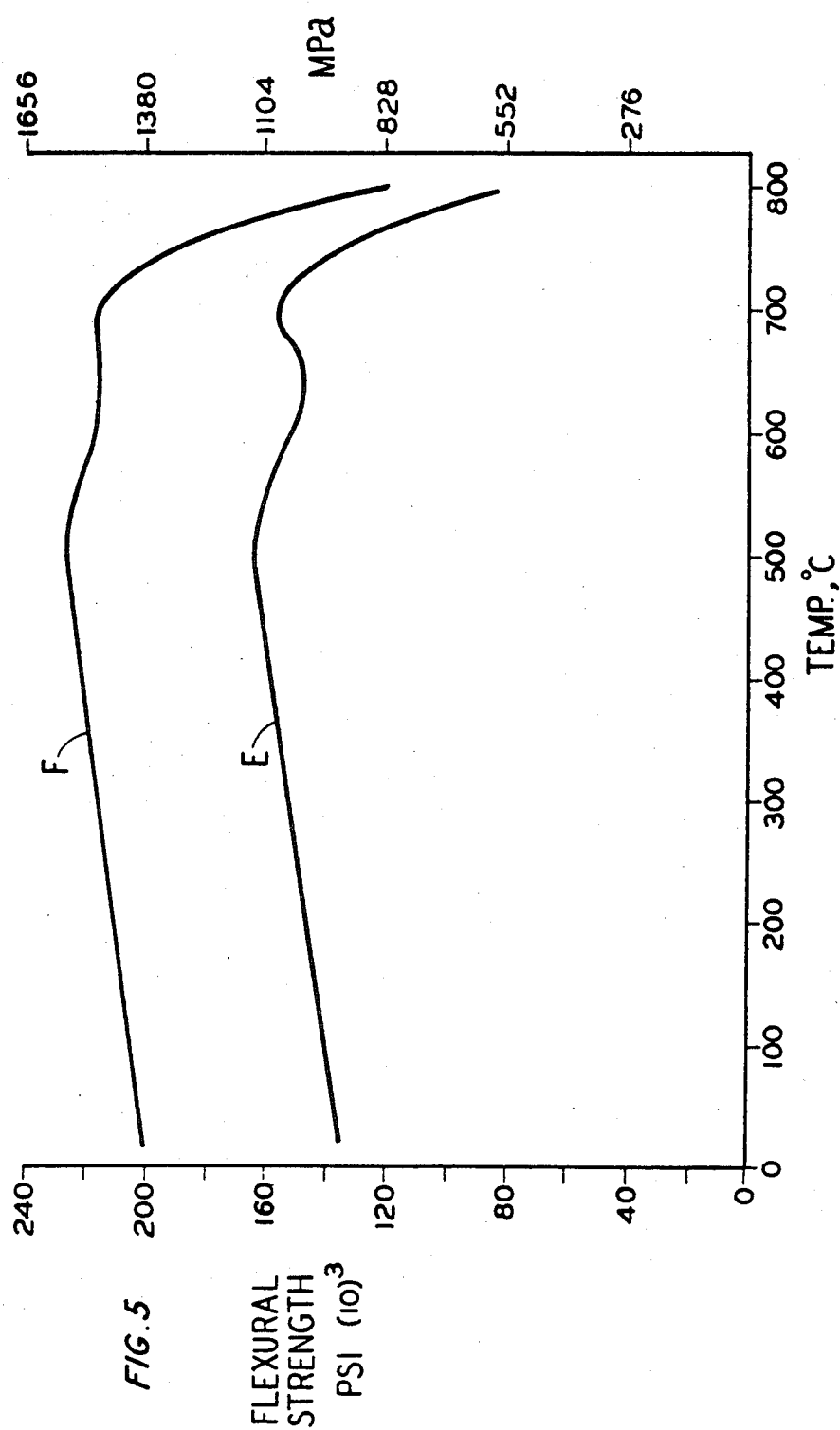
FIG. 5 shows flexural strength data for an aluminosilicate glass composite component according to the present invention.

FIG. 5 demonstrates the exceptional flexural strength of an aluminosilicate glass-silicon carbide fiber reinforced composite. FIG. 5 (fiber loading of 50% by volume) shows for a 0°/90° fiber orientation (curve E) flexural strengths of over 75,000 psi and preferably over 100,000 psi maintained to temperatures up to about 700° C.; and for a 0° fiber orientation (curve F) flexural strengths of over 150,000 psi and preferably over 200,000 psi are maintained to temperatures up to about 700° C. Fracture toughness, as measured by a three-point notched beam test, results in critical stress intensity factors ($K_{IC}$) above 15,000 psi (inch)$^{\frac{1}{2}}$ for the 0°/90° orientation and above 25,000 psi (inch)$^{\frac{1}{2}}$ for the 0° orientation that are maintained up to about 700° C.

Figure 6:
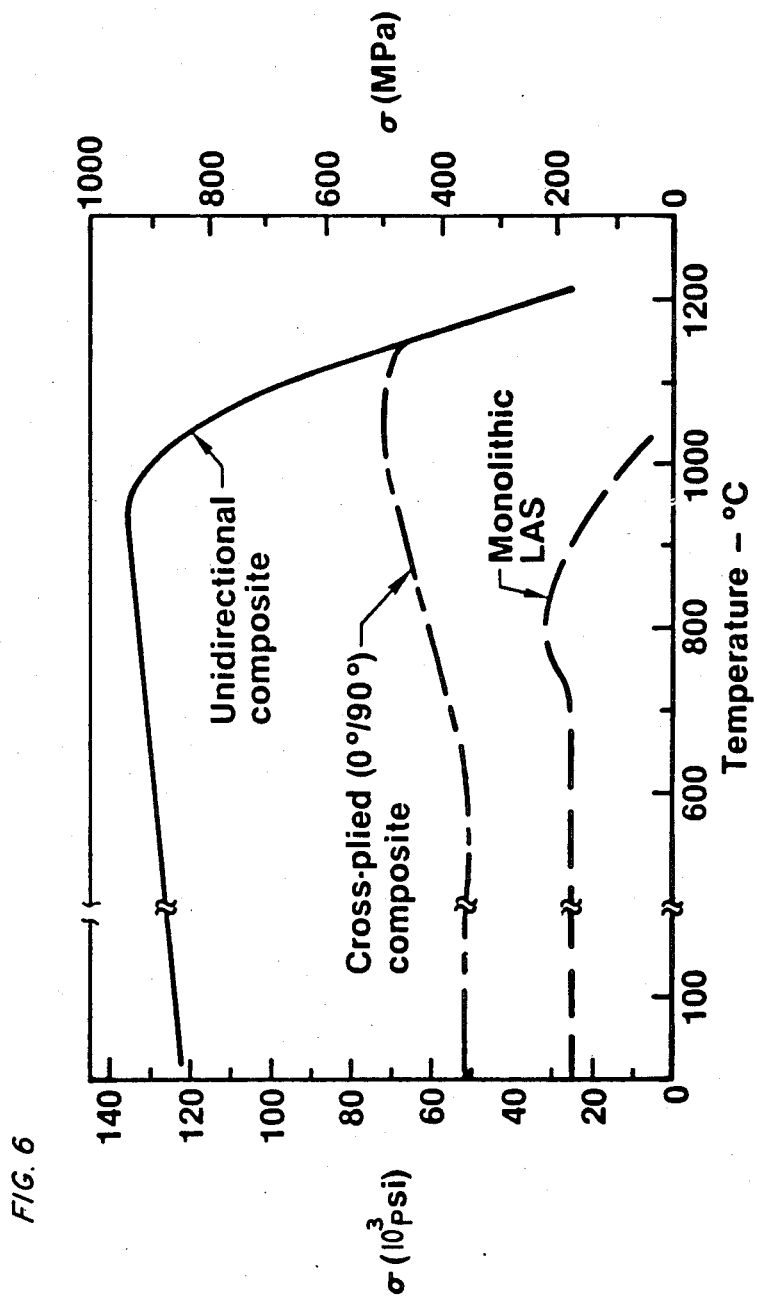
FIG. 6 shows flexural strength data for lithium aluminosilicate glass-ceramic components reinforced with silicon carbide fibers according to the present invention.

FIG. 6 demonstrates flexural strength of a composite component according to the present invention, where unidirectionally reinforced composite samples (50 volume % SiC), heat-treated after hot-pressing in order to crystallize the matrix into the $\beta$-spodumene ($Li_2O \cdot Al_2O_3 \cdot 4SiO_2$) structure, have been found to exhibit bend strengths of over $90 \times 10^3$ psi from room temperature to slightly over 1830° F. (1000° C.). Cross-plied samples (0°/90°) have exhibited strengths of over $50 \times 10^3$ psi in the same temperature range. Monolithic LAS materials, such as Corning 9608, exhibit bend strengths of less than $30 \times 10^3$ psi from room temperature to 1650° F. (900° C.) with very little useful strength ($10 \times 10^3$ psi) at 1830° F. (1000° C.). In addition, the steady state creep rate in bending at an applied stress of $35 \times 10^3$ psi for an axially reinforced composite has been measured to be $1.3 \times 10^{-5}$ hr$^{-1}$ at 1830° F. (1000° C.) with no measurable creep below 1650° F. (900° C.).

Figure 7:
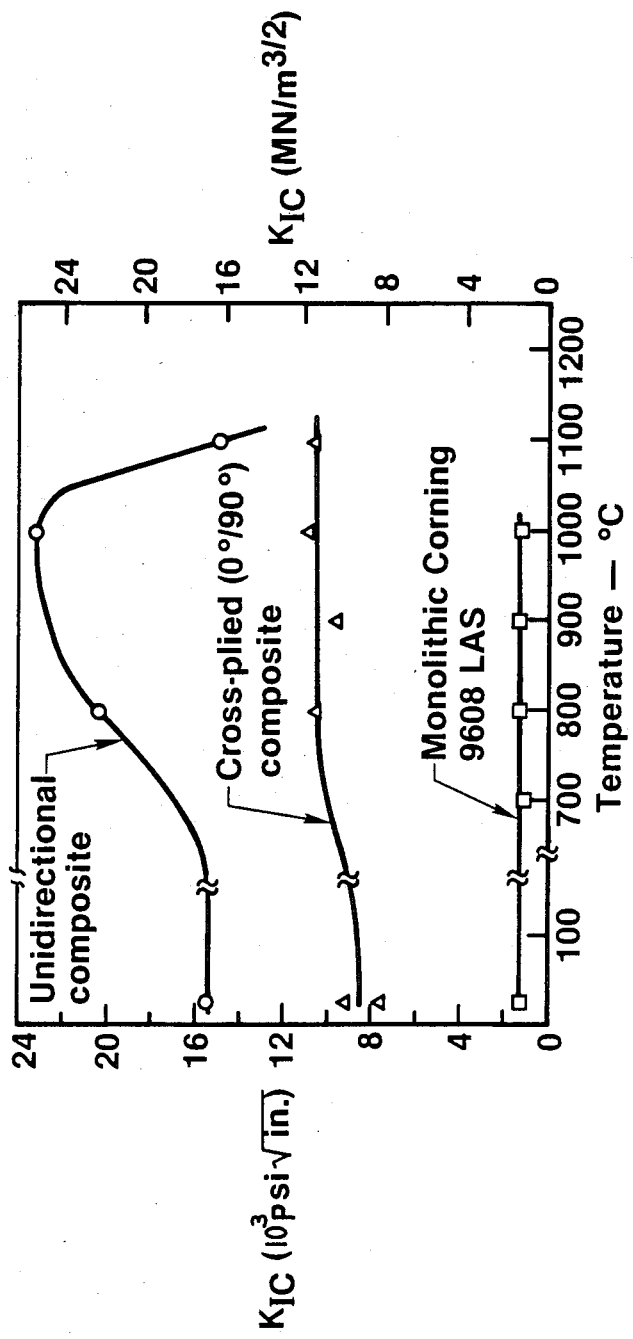
FIG. 7 shows fracture toughness data for lithium aluminosilicate glass-ceramic components reinforced with silicon carbide fibers according to the present invention.

The mechanical property that ranks as the most impressive for the LAS/SiC system, is its fracture toughness, FIG. 7. As measured by the notched beam test, axially reinforced samples exhibit $K_{IC}$ (fracture toughness) values of $15 \times 10^3$ psi inch$^{\frac{1}{2}}$ at room temperature and $22 \times 10^3$ psi inch$^{\frac{1}{2}}$ at 1830° F. (1000° C.). These values are only slightly less than those typical of graphite resin composites and some aluminum alloys. When cross-plied (0°/90°), LAS/SiC composites still exhibit $K_{IC}$ values of over $8 \times 10^3$ psi inch$^{\frac{1}{2}}$. Monolithic Corning 9608 LAS, on the other hand, has a very low fracture toughness of $1.2 \times 10^3$ psi inch$^{\frac{1}{2}}$. Even hot-pressed $Si_3N_4$, which is the toughest high temperature monolithic structural ceramic being extensively investigated for use as a gas turbine component material, has a $K_{IC}$ of only $4-5 \times 10^3$ psi inch$^{\frac{1}{2}}$.

For forming components with discontinuous silicon carbide fiber reinforcement, the above described fibers are chopped to paper length (e.g. about 1.0 to about 3.0 cm) by any conventional means and formed into sheets by conventional papermaking techniques. Note copending, commonly assigned U.S. patent application Ser. Nos. 345,996, now U.S. Pat. No. 4,399,231 issued 8/16/83, and 345,998, now U.S. Pat. No. 4,410,635 issued 10/18/83 filed Feb. 5, 1982, the disclosures of which are incorporated by reference.

While the silicon carbide paper used in the samples of the present invention was isotropically laid, i.e. substantially equal number of fibers in-plane in every direction, the fiber laying can be favored in a particular in-plane direction in preparation of an article when it is known that such article will be receiving stress primarily in a single direction. However, to insure the improved properties of composites of the present invention, such favored laying should not exceed about 90% of the total fiber laying, the fibers should be laid in-plane, and average fiber length should preferably be about 1 to about 3 cm.

The composite component of the present invention is preferably formed by cutting the formed paper to the desired composite shape followed by papermaking binder removal, for example by solvent immersion or touching each ply to a bunsen burner flame to burn off the binder. The plies are next either dipped in a slurry of the glass-ceramic or simply stacked with layers of powdered glass-ceramic sufficient to substantially fill the spaces between the plies placed between each ply. The formed articles are then hot pressed at elevated temperature to form the composite component as described above.

The processing parameters and composition of the material used can vary widely, depending on the ultimate use of the article. While it is not necessary to lay the plies in any particular direction, it has been found that the best strength properties appear to be obtained when each individual ply is laid up in the same direction, i.e. all plies are aligned during lay-up to keep colinear their original orientation with regard to the paper roll axis.

The preferred method for forming the articles of the present invention is by hot pressing the mixture of silicon carbide fibers and noncrystalline ceramic powder as mentioned above. This method gives particular design flexibility in orienting the fibers, and sheets formed by such method are particularly adapted to hot pressing into desired shapes. An exemplary method comprises continuously unwinding a roll of silicon carbide paper from a spool at a moderate rate of speed and passing such fibers through a slip of the powdered ceramic, solvent and plasticizer to impregnate the sheets. The impregnated sheets can then be rewound onto a larger rotating spool. An exemplary slip composition may be composed of 40 gm of powdered glass ceramic and 780 ml of propanol. An alternative composition may comprise 85 gm of the glass ceramic and 200 gm of propanol, 10 gm of polyvinyl alcohol and 5 drops (approximately 1 cc) of a wetting agent such as Tergitol ®. The receiving drum is preferably run at one revolution per minute or linear speed of 5 feet per minute (2.54 cm per sec.). Excess glass ceramic and solid can be removed by pressing a squeegee against the drum as it winds. Preferably the ground ceramic is sized so that 90% of it passes through a $-325$ mesh sieve. The thus impregnated tape is then dried either at ambient temperature or with a radiant heat source to remove solvent.

Following impregnation, the sheets are removed from the drum and cut into strips to conform to the dimensions of the article to be fabricated. In a key processing step, the assembled composite is then hot pressed either under vacuum or inert gas such as argon in metal dies coated with colloidal boron nitride or graphite dies sprayed with boron nitride powder at pressures of 6.9-13.8 MPa (1000-2000 psi) and temperatures of 1100° C.-1500° C. Time of hot pressing will vary depending on composite makeup, but generally will be accomplished between about 10 minutes and 1 hour. Additional glass also in powder form may be inserted between each layer as it is laid. SiC fiber loading in the composite is preferably about 15% to about 50% by volume. The mold can also be vibrated to ensure uniform distribution of the ceramic powder over the laid fiber surfaces. Processing by starting with the matrix material in the glassy state to permit composite densification by hot pressing, followed by converting the ceramic into the crystalline state largely contributes to the superior properties of the resulting composite. If after hot pressing, any significant portion of the ceramic matrix material is found to be in the glassy state, further heat treatment may be necessary to substantially completely crystallize the matrix for optimum high temperature performance. And although it is preferred to have the ceramic matrix material in the fully ceramic state, acceptable composite properties are attainable even if some of the ceramic matrix is retained in the composite in the glass state, e.g. up to 25% by weight.

Based on the composition of the matrix material, the particular fiber reinforcement, and the process of forming the composite, an article with exceptional high strength, fracture toughness, and oxidation resistance especially at high temperatures is obtained.

It is particularly noteworthy that, even after initial fracture, composite components of the present invention should retain a substantial fracture of their original untested strength. This resistance to fracture, even in the presence of initiated damage, is distinctly different from the brittle nature of conventional ceramic articles.

Typical discontinuous fiber reinforced composite components according to the present invention are shown in FIGS. 8 and 9. FIG. 8 shows a top view in cross-section of an actual discontinuous silicon carbide fiber reinforced glass-ceramic matrix composite component according to the present invention, and FIG. 9 shows a fracture surface of an actual discontinuous silicon carbide fiber reinforced glass-ceramic matrix composite component according to the present invention.

While the components of the present invention can be used in any suitable area of the gas turbine engine, their primary utility is in those areas of the engine which see temperatures over about 500° C. up to about 1300° C., which consists primarily of the core engine. Accordingly, by core engine components is meant any component in the gas turbine engine which will be subjected to temperatures over approximately 500° C.

Representative core engine components include those in the compressor section of the gas turbine, the turbine section, the combustor section and the afterburner (augmentor) section. Examples of such components include: blades—both compressor and turbine; vanes—both compressor and turbine; disks to retain the above mentioned blades or ceramic or metal blades; sideplates to prevent inefficient air bleed through turbine stages; abradable outer air seal shoes; combustor liners; afterburner internal flaps and seals; and burner and turbine case structures as well as other thin walled structures subjected to high temperatures.

Figure 13:
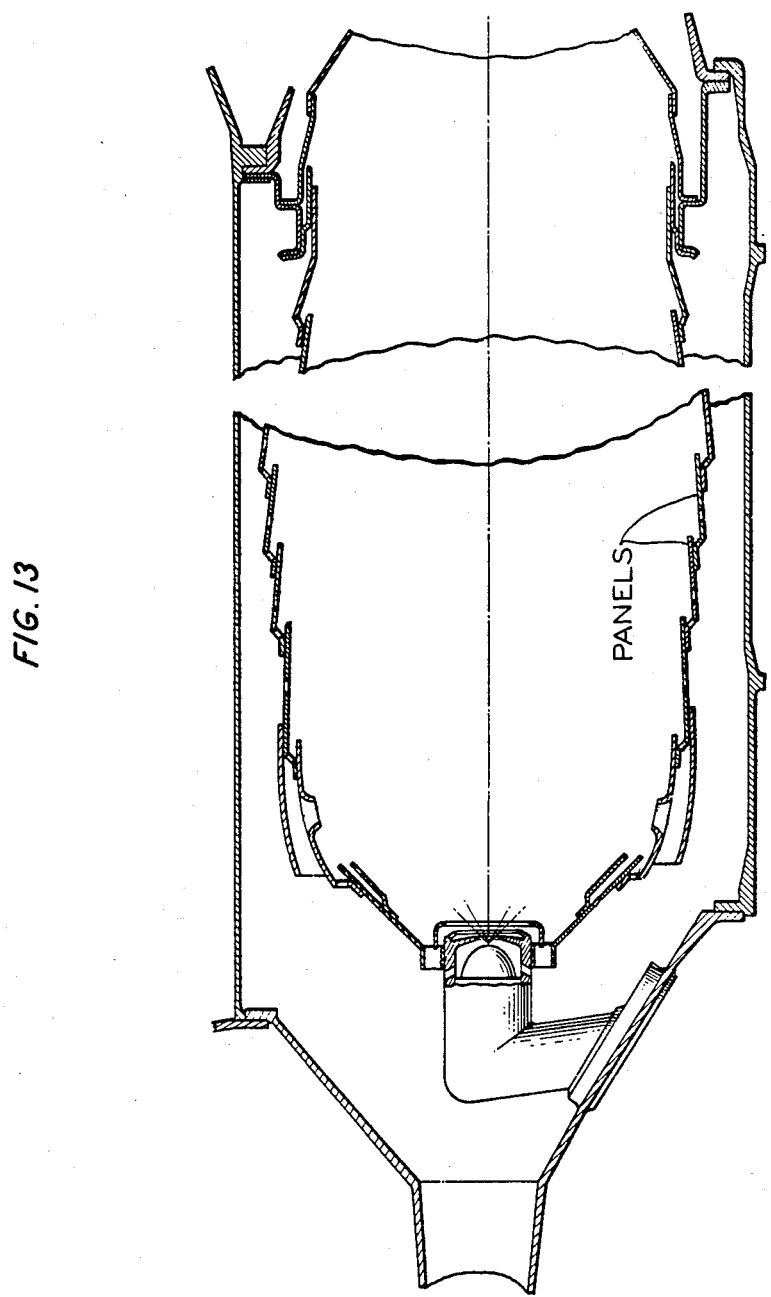
FIG. 13 shows combustor liner segment panels according to the present invention.

FIGS. 11 through 13 show some of these applications as follows: FIG. 11 shows blades, vanes and seals; FIG. 12 shows augmentor flaps and seals; and FIG. 13 shows combustor liner segment panels.

Figure 10A:
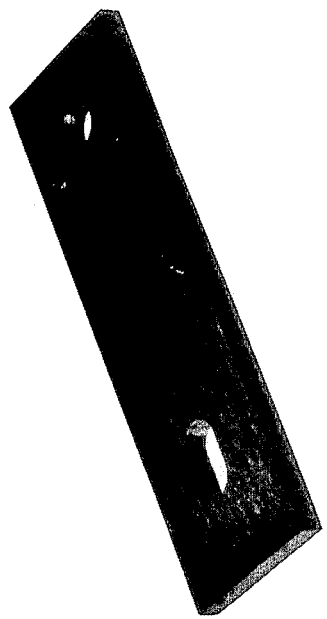
FIGS. 10A and B show an augmentor divergent seal test component before and after actual testing in an augmentor duct.
Figure 10B:
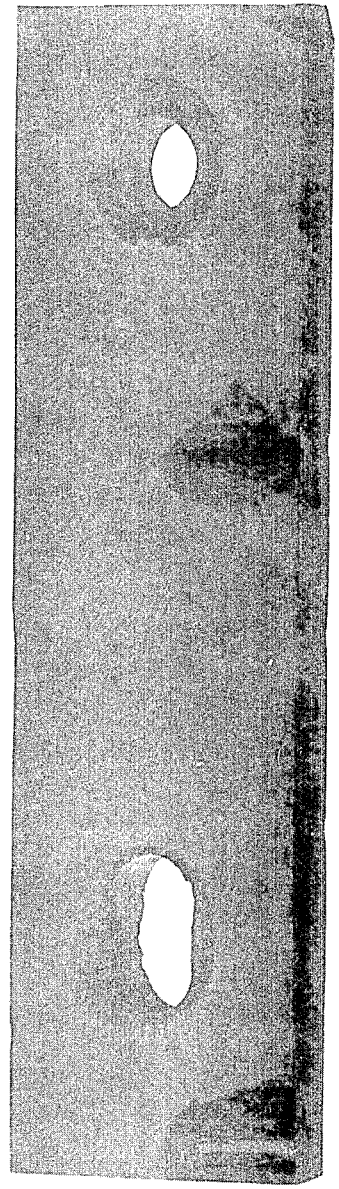

An augmentor divergent seal test coupon was made and tested to demonstrate the improved components described herein. A 0/90 cross ply reinforced 3.7"×1"×0.2" plate of this material (shown in FIG. 10A) was ground base engine tested in the augmentor duct of a P&WA F-100 engine. Riveted to a metal divergent seal, this component saw a total of 331 engine hours, 2459 thermal cycles and 16.7 hours of maximum augmented thrust at temperatures in excess of approximately 1600° F. (871° C.). Despite the fact that one of the metal rivets and a neighboring metal fitting failed during this test, the composite specimen survived essentially unscathed (shown in FIG. 10B). Only slight surface damage was sustained when the remaining metal rivet was removed using a chisel and hammer, thus indicating in an unplanned manner the ability to survive severe impact.

The composite material strength, both hot and cold, and stability both in distortion and oxidation resistance, coupled with high fracture toughness make the components of the present invention particularly useful in this environment. For example, graphite epoxy materials are generally not useful above 200° C. and graphite glass composites are usually impractical in environments which see temperatures above 350° C. As such, the components of the present invention are far superior to anything previously attempted in this environment.

The materials of the present invention also provide a wide variety of choice of matrix material based on the particular engine temperature that the components will encounter. For example, if only temperatures up to about 600° C. will be seen by the components, the glass matrix, and particularly the borosilicate glass will be suitable. At use temperatures up to 700° C., the aluminosilicate glass can be used. And at component temperatures of up to about 1300° C. the high silica content glass and the glass-ceramic matrix materials can be used. Of course, matrices suitable for components which will see the higher temperatures would naturally also be suitable for use in the lower temperature environments.

Although the invention has been shown and described with respect to detailed embodiments thereof, it should be understood by those skilled in the art that various changes and omissions in form and detail may be made therein without departing from the spirit and scope of the invention.

We claim:

1. A gas turbine engine core engine component selected from blades, vanes, discs, side plates, seals, combustor liners, flaps, burner case structures or turbine case structures; comprising a plurality of substantially titanium-free ceramic layers selected from (a) aluminosilicate, (b) lithium aluminosilicate, (c) magnesium aluminosilicate, or (d) mixtures thereof, each layer reinforced with a plurality of unidirectional, continuous length silicon carbide fibers, each layer having an axial flexural strength exemplified by a critical stress intensity factor greater than $10 \times 10^3$ psi (inch)$^{\frac{1}{2}}$, high temperature strength, high temperature oxidation stability, and good insulating properties.

2. The component of claim 1 wherein the silicon carbide fiber containing layers are uniaxially oriented.

3. The component of claim 1 wherein the silicon carbide fiber containing layers are multiaxially oriented.

4. The component of claim 3 wherein the fibers are oriented to 0°/90°, 0°/±45°/90°, or 0°/30°/60°/90° orientation.

5. The component of claim 1 wherein the silicon carbide fibers comprise a multifilament silicon carbide yarn with an average filament diameter of up to 50 microns.

6. The component of claim 5 wherein the yarn has an average filament diameter of 5-15 microns.

7. The component of claim 1 wherein the silicon carbide fibers are present in an amount of at least about 40% by volume.

8. The component of claim 1 wherein the composite is formed by starting with the ceramic in the glassy state and converting it from the glassy state to the ceramic state after densification of the composite.

9. A gas turbine engine containing at least one core engine component selected from blades, vanes, discs, side plates, seals, combustor liners, flaps, burner case stuctures or turbine case structures, comprising a plurality of substantially titanium-free ceramic layers selected from the group consisting of (a) aluminosilicate, (b) lithium aluminosilicate, (c) magnesium aluminosilicate, or (d) mixtures thereof, each layer reinforced with a plurality of unidirectional, continuous length silicon carbide fibers, each layer having an axial flexural strength greater than 70,000 psi, a high fracture toughness exemplified by a critical stress intensity factor greater than $10 \times 10^3$ psi (inch)$^{\frac{1}{2}}$, high temperature strength, high temperature oxidation stability, and good insulating properties.

* * * * *